United States Patent
Chanclou (10) Patent No.: US 10,070,209 B2
(45) Date of Patent: Sep. 4, 2018

(54) CASCADE-FORM WAVELENGTH DIVISION MULTIPLEXING OPTOELECTRONIC TRANSCEIVER DEVICE, SYSTEM AND METHOD

(71) Applicant: ORANGE, Paris (FR)

(72) Inventor: Philippe Chanclou, Lannion (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 15/518,154

(22) PCT Filed: Oct. 9, 2015

(86) PCT No.: PCT/FR2015/052730
§ 371 (c)(1),
(2) Date: Apr. 10, 2017

(87) PCT Pub. No.: WO2016/059330
PCT Pub. Date: Apr. 21, 2016

(65) Prior Publication Data
US 2017/0295417 A1    Oct. 12, 2017

(30) Foreign Application Priority Data
Oct. 13, 2014    (FR) ..................................... 1459816

(51) Int. Cl.
*H04J 14/02*    (2006.01)
*H04Q 11/00*    (2006.01)
(Continued)

(52) U.S. Cl.
CPC ....... *H04Q 11/0071* (2013.01); *G02B 6/3897* (2013.01); *G02B 6/4246* (2013.01);
(Continued)

(58) Field of Classification Search
CPC .............. H04J 14/0282; H04J 14/0212; H04B 10/2503
See application file for complete search history.

(56) References Cited

U.S. PATENT DOCUMENTS

| | | | |
|---|---|---|---|
| 6,233,074 B1 * | 5/2001 | Lahat ................. | H04J 14/0212 398/79 |
| 2002/0039213 A1 * | 4/2002 | Duerksen ............ | G02B 6/2932 398/83 |

(Continued)

FOREIGN PATENT DOCUMENTS

| | | |
|---|---|---|
| EP | 1 388 963 A2 | 6/2003 |
| EP | 2 541 808 A1 | 6/2011 |
| WO | 99/60740 | 11/1999 |

OTHER PUBLICATIONS

Attached please find the Written Opinion for the application PCT/FR2015/052730.

(Continued)

*Primary Examiner* — Dzung Tran
(74) *Attorney, Agent, or Firm* — Haverstock & Owens LLP (57) ABSTRACT

The invention relates to an optoelectronic transceiver device comprising a first optical connector (OC1) capable of connection to a first bidirectional optical fiber (OF1), and a second optical connector (OC2) capable of connection to a second bidirectional optical fiber (OF2), the device further comprising: an insertion-extraction module (ADM) capable of: extracting a wavelength ($\lambda_{Rx}$) from a plurality of wavelengths constituting a first optical signal received by the first optical connector (OC1) and transmitting the first optical signal without the extracted wavelength to the second optical connector (OC2); inserting a wavelength ($\lambda_{Tx}$) into a second optical signal received by the second optical connector (OC2) and transmitting the second optical signal with (Continued)

the inserted wavelength to the first optical connector (OC1); an electric-optical conversion module (EC1) capable of providing the insertion-extraction module with the wavelength ($\lambda_{Tx}$) inserted into the second optical signal from an incoming electric signal (Data Tx); and an optical-electric conversion module (EC2) capable of converting the wavelength ($\lambda_{Rx}$) extracted from the first optical signal by the insertion-extraction module into an outgoing electric signal (Data Rx).

17 Claims, 3 Drawing Sheets

(51) Int. Cl.
    *H04B 10/25*     (2013.01)
    *G02B 6/42*     (2006.01)
    *G02B 6/38*     (2006.01)

(52) U.S. Cl.
    CPC ...... *H04B 10/2503* (2013.01); *H04J 14/0212* (2013.01); *H04J 14/0223* (2013.01); *H04J 14/0282* (2013.01); *H04Q 11/0067* (2013.01); *H04Q 2011/0016* (2013.01); *H04Q 2011/0033* (2013.01); *H04Q 2011/0081* (2013.01)

(56) References Cited

U.S. PATENT DOCUMENTS

| | | | | |
|---|---|---|---|---|
| 2004/0033076 A1* | 2/2004 | Song | ............ | H04J 14/0216 398/70 |
| 2007/0147841 A1* | 6/2007 | Takita | ............ | H04J 14/0204 398/83 |
| 2010/0124391 A1* | 5/2010 | Feuer | ............ | H04J 14/0204 385/24 |
| 2010/0322622 A1* | 12/2010 | Shukunami | ...... | H04B 10/07953 398/26 |

OTHER PUBLICATIONS

Y. Zhao, "A Novel Bi-Directional Add/Drop Module for Single Fiber Bi-Directional Self-Healing Wavelength Division Multiplexed Ring Networks" XP-000966861.

* cited by examiner

Fig 4

CASCADE-FORM WAVELENGTH DIVISION MULTIPLEXING OPTOELECTRONIC TRANSCEIVER DEVICE, SYSTEM AND METHOD

1. FIELD OF THE INVENTION

The application for invention lies in the field of optical distribution networks (ODN) which serve subscribers to electronic communications services, and more particularly those which combine various types of wavelength multiplexing.

2. PRIOR ART

The architectures of optical access networks typically use a different wavelength per direction of transmission, the various users of a network sharing time windows of the signal. This technique called TDM (Time Division Multiplexing) shows limits in terms of maximum bitrates.

Another technique allowing higher transmission bitrates, studied within standardization bodies by the SG15 group of the ITU (International Telecommunication Union), consists in associating a multiplex of wavelengths with users. This technique called WDM (Wavelength Division Multiplexing) is used alone by allocating a pair of wavelengths (upgoing and downgoing direction) per user, or in combination with the TDM technique, then dubbed TWDM.

Figure 1:
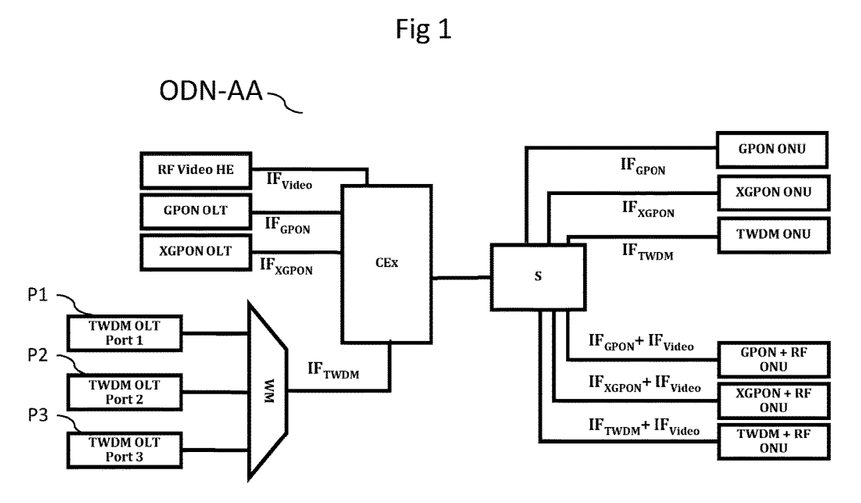
FIG. 1 presents a mixed optical distribution infrastructure, according to the prior art.

These TWDM and WDM systems currently undergoing standardization (typically via the NG-PON2 standard of the ITU-T Q2 SG15 G.989.x) are or will be deployed in addition to the previously deployed TDM systems (typically the G-PON and XG-PON1 standards) and will coexist with them, for economic reasons and reasons of user migration. As illustrated by FIG. 1, an optical infrastructure can therefore be mixed, that is to say allow the connection of optical-line terminals (commonly called OLTs) which are TDM, TWDM or WDM, to optical-network terminals (ONU, for Optical Network Units) which are TDM, TWDM or WDM. An OLT of TWDM or WDM type possesses a different port associated with each upgoing and downgoing wavelength pair.

In a mixed ODN such as this, a passive box called CEx (for Co-Existence element) carries out on a single fiber a multiplexing in the downgoing direction and a demultiplexing in the upgoing direction, of the wavelengths of each of the OLT ports of TDM, TWDM or WDM type. Upstream of the CEx box, the wavelengths of the TWDM and WDM systems must, however, be grouped band-wise in order to be multiplexed and demultiplexed by individual wavelength by a box called a WM (Wavelength Multiplexer) so as to limit the number of ports at the input of the CEx box, a unique bandwidth being associated with each port.

This WM box must be adapted, during its installation, specifically to the set of wavelength channels of each port of each WDM or TWDM OLT that the operator of the ODN network envisages operating at that moment. This leads to complexity and an initial cost overhead and makes it difficult and expensive to upgrade the network in any way.

One of the aims of the invention is to remedy these drawbacks of the prior art.

3. DISCLOSURE OF THE INVENTION

The invention improves the situation with the aid of an optoelectronic emitter-receiver device comprising a first optical connector able to be connected to a first bidirectional optical fiber, and a second optical connector able to be connected to a second bidirectional optical fiber, the device furthermore comprising:

an insertion-extraction module able to:
extract a wavelength in a plurality of wavelengths making up a first optical signal received by the first optical connector and transmit the first optical signal without the extracted wavelength to the second optical connector;
insert a wavelength into a second optical signal received by the second optical connector and transmit the second optical signal with the inserted wavelength to the first optical connector;
an electrical-optical conversion module able to provide the insertion-extraction module with the wavelength inserted into the second optical signal on the basis of an incoming electrical signal; and
an optical-electrical conversion module able to convert the wavelength extracted from the first optical signal by the insertion-extraction module into an outgoing electrical signal.

The optoelectronic emitter-receiver device according to the invention makes it possible in a clever manner to eliminate the WM wavelength multiplexing/demultiplexing box. Indeed, it suffices that the TWDM or WDM OLT ports of the mixed optical distribution infrastructure each be equipped with a device according to the invention, and that the set of devices be connected directly to the CEx box of the mixed infrastructure. Consequently, there is no longer any need for the WM box between the OLT ports and the CEx, and the drawbacks of the WM namely among others its cost overhead and its lack of upgradability disappear.

As the insertion-extraction module of a device inserts and extracts in the optical fiber present at the first optical connector only the wavelengths associated with this device, that is to say associated with its OLT port, while letting the other wavelengths of the optical signal pass intact through the module, it is possible to recover the signals present at the second optical connector in another optical fiber connected to another OLT port with which different upgoing (entering the device) and downgoing (exiting the device) wavelengths are associated.

Running counter to the preconceptions of the person skilled in the art who would reserve each of the two optical connectors for a different direction of transmission, the device according to the invention allows the connection of a bidirectional optical fiber to each of the two optical connectors.

It is therefore understood that by using several devices according to the invention, the OLT ports can be cascaded together and that it suffices that a single of these OLT ports, the first of the cascade, be connected to the CEx box through the first optical connector of its device. Its second optical connector is connected by an optical fiber to the first optical connector of the device of a second OLT port, and so on and so forth. The OLT ports of different pairs of wavelengths thus connect together in cascade through their respective device, until the last of the cascade, whose second connector is not used. The order of the OLT ports in the cascade is of no importance, thereby making it easier to install and upgrade the configuration of the OLT ports in the mixed optical distribution infrastructure, since it suffices to connect a new OLT port to the, unused, second optical connector of the device at the end of the cascade, as and when the needs of infrastructure planning arise.

According to one aspect of the invention, the optoelectronic emitter-receiver device furthermore comprises a selection module for selecting the wavelengths to be inserted and extracted, configured to instruct the insertion-extraction module regarding the wavelength to be extracted from the first optical signal and the wavelength to be inserted into the second optical signal.

By virtue of this aspect, the device is wavelength generic, thereby allowing the fabrication and the use of a single model for all the TWDM and WDM OLT ports, the downgoing and upgoing wavelengths being selected on the device during its installation on an OLT port.

According to one aspect of the invention, the optoelectronic emitter-receiver device furthermore comprises an electrical socket able to transmit the incoming and outgoing electrical signals, said socket being able to connect in a removable manner to an optical-line terminal port.

By virtue of this aspect, the device is an item independent of the port of the OLT, thereby enabling the use of existing standards of optoelectronic connection technology such as those available in plug-in optoelectronic modules of XFP or SFP+ type. Optoelectronic modules such as these are moreover inexpensive.

According to one aspect of the invention, the electrical socket is furthermore able to transmit to the selection module an electrical signal comprising information relating to the wavelengths to be inserted and extracted.

By virtue of this aspect, the upgoing and downgoing wavelengths that the device must use can be communicated to it through the port of the OLT, this having the advantage of not requiring any physical operation other than plugging the device into the port, and of being able thereafter to modify the wavelengths remotely, if necessary.

According to one aspect of the invention, an electrical signal comprising information relating to the wavelengths to be inserted and extracted is transmitted to the selection module by an electrical socket distinct from the electrical socket able to transmit the incoming and outgoing electrical signals.

By virtue of this aspect, the upgoing and downgoing wavelengths that the device must use can be communicated to it without passing through the port of the OLT, this having the advantage of being able to select the wavelengths in advance, at the manufacturer of the device for example, before the operation of plugging the device into the port of the OLT, and of being able to modify the wavelengths independently of the port of the OLT, if necessary, even if the device is plugged into the port of the OLT.

According to one aspect of the invention, the optical connectors are able to connect in a removable manner to the bidirectional optical fibers.

By virtue of this aspect, standard optical connection technology can be used such as for example two optical connectors of LC type, thereby making it possible for optical fibers to be easily connected and disconnected on the optoelectronic emitter-receiver device, and for the production and installation costs thereof to be lowered.

The various aspects of the optoelectronic emitter-receiver device which have just been described can be implemented independently of one another or in combination with one another.

The invention also relates to a system for connecting a plurality of ports of optical-line terminals to an optical distribution network, the optical-line-terminal ports being connected to an optoelectronic emitter-receiver device such as that just described, the devices of the plurality being connected together while forming a cascade, the second optical connector of a device of the cascade being linked by optical fiber to the first optical connector of a following device in the cascade, the first optical connector of the first device of the cascade being linked to the optical distribution network by an optical fiber.

Such a system is advantageous since it makes it possible to eliminate the WM boxes and all their interfaces with the TWDM and WDM OLT ports. It suffices to connect any of the optoelectronic emitter-receiver devices of the OLT ports to the CEx box, and then to connect the other devices to it in cascade, in any order. This system therefore furthermore exhibits great flexibility in respect of the planning and upgrading of the optical distribution infrastructure, as well as great ease of installation of the OLT ports.

The invention relates finally to a method of optoelectronic emission-reception between a first optical connector able to be connected to a first bidirectional optical fiber, and a second optical connector able to be connected to a second bidirectional optical fiber, the method comprising the following steps:

extraction of a wavelength in a plurality of wavelengths making up a first optical signal received by the first optical connector;

transmission of the first optical signal without the extracted wavelength to the second optical connector;

insertion of a wavelength into a second optical signal received by the second optical connector;

transmission of the second optical signal with the inserted wavelength to the first optical connector;

obtaining of the wavelength inserted into the second optical signal by conversion of an incoming electrical signal;

conversion of the wavelength extracted from the first optical signal into an outgoing electrical signal.

This method implements all the aspects of the optoelectronic emitter-receiver device according to the invention, which has just been described.

4. PRESENTATION OF THE FIGURES

Other advantages and characteristics of the invention will be more clearly apparent on reading the following description of particular embodiments of the invention which are given by way of simple illustrative and nonlimiting example, and of the appended drawings, among which.

5. DETAILED DESCRIPTION OF AT LEAST ONE EMBODIMENT OF THE INVENTION

In the subsequent description, embodiments of the invention are presented in the case of mixed optical distribution infrastructures using WDM and/or TWDM techniques, in addition to TDM techniques. These infrastructures can comprise passive optical networks (PON) currently undergoing or shortly to undergo standardization at the ITU-T, such as the PON networks of NG-PON2 type, as well as other types of networks, in addition to or in place of PON networks, such as for example point-to-point optical networks.

FIG. 1 presents an ODN-AA mixed optical distribution infrastructure, according to the prior art.

For simplicity of illustration, this and the following figure show only a few TDM OLTs and only a few TWDM or WDM OLT ports, knowing that they may reach several tens or indeed several hundred in number in one and the same mixed optical distribution infrastructure. Likewise, only one ONU per OLT or per OLT port is illustrated, knowing that each OLT typically serves 64 or 128 ONUs.

In such an infrastructure mixing TDM, TWDM and WDM techniques, the OLTs of TDM type such as "GPON OLT" and "XGPON OLT" are connected by bidirectional interfaces respectively $IF_{GPON}$ and $IF_{XGPON}$, on optical fiber, directly to a so-called "co-existence" CEx box. Other interfaces such as for example the interface $IF_{Video}$ of a video network front end can also be connected to the CEx box.

The ports P1, P2 and P3 of an OLT of TWDM type such as "TWDM OLT" are not connected directly to the CEx box but through a WM intermediate multiplexer/demultiplexer so that a single bidirectional interface $IF_{TWDM}$, covering all the TWDM wavelength channels on a single optical fiber, is presented to the CEx box. This WM element must be specifically configured for the wavelengths that the operator envisages using with their TWDM OLT ports. The CEx box is itself connected by a bidirectional optical fiber to one or more couplers S, positioned in series at a distance relatively close to the users served by the mixed infrastructure. A single coupler is shown here for simplicity. The coupler S is connected to the optical line terminals of the users, denoted "GPON ONU", "XGPON ONU", "TWDM ONU", "GPON+RF ONU", etc.

It should be noted that OLTs of point-to-point type, not illustrated in FIG. 1, each use an upgoing and downgoing wavelength pair, and therefore have bidirectional signals which also need to be grouped together by a WM element. It is therefore understood that according to the prior art, several WM elements may thus have to be connected to a single CEx box.

Figure 2:
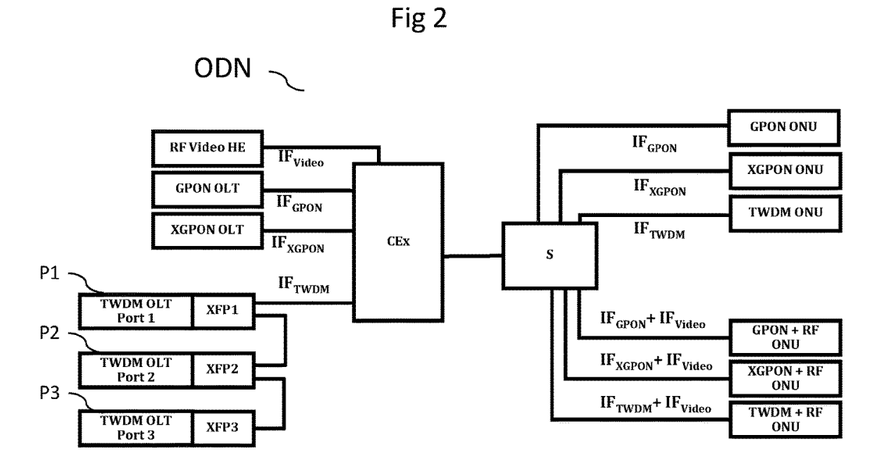
FIG. 2 presents a mixed optical distribution infrastructure, according to a particular embodiment of the invention.

FIG. 2 presents an ODN mixed optical distribution infrastructure, according to a particular embodiment of the invention.

In this particular embodiment of the invention, the ports P1, P2 and P3 of the OLT "TWDM OLT" are each equipped with an optoelectronic emitter-receiver device according to the invention, denoted respectively XFP1, XFP2 and XFP3. The particular feature of this device is to tap off, from a bidirectional optical signal, the upgoing wavelength associated with the port of the OLT, and to insert into this bidirectional optical signal the downgoing wavelength associated with the port of the OLT, while leaving the other wavelengths of the bidirectional optical signal intact. By virtue of this particular feature, the MW element is no longer necessary since it suffices to connect a single of the devices of OLT ports to the CEx box through a bidirectional optical fiber, and then to connect the other devices to this device in cascade, through bidirectional optical fibers.

It is understood that not only are one or more WM boxes no longer necessary but also that no modification is necessary in the other elements of the optical distribution infrastructure, such as the CEx box and the splitter, or in the ONUs on the clients' side.

It should be noted that the invention also applies to the OLTs of point-to-point type, not illustrated in FIG. 2.

Figure 3:
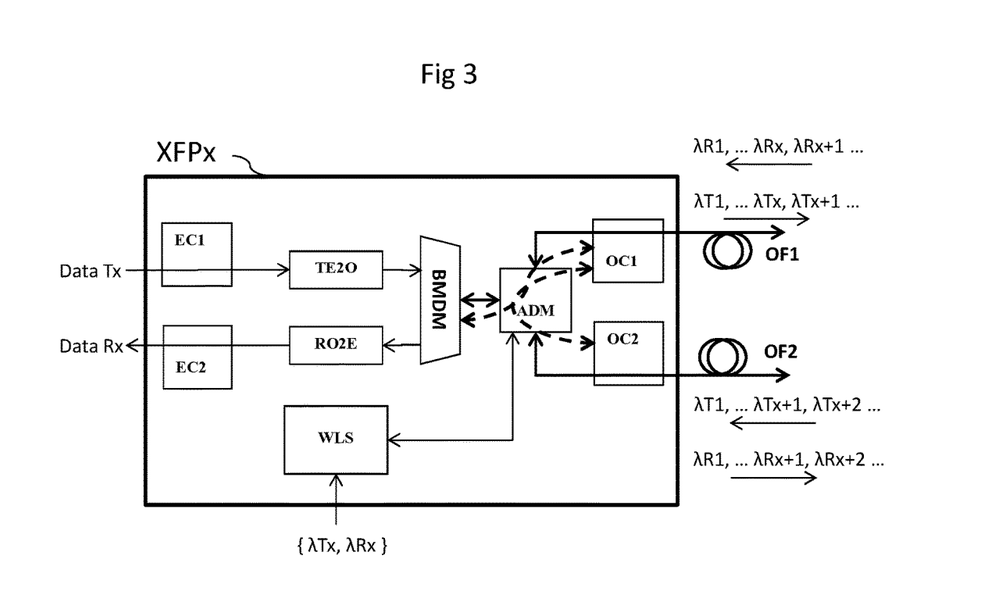
FIG. 3 presents an optoelectronic emitter-receiver device according to a particular embodiment of the invention.

FIG. 3 presents an optoelectronic emitter-receiver device according to a particular embodiment of the invention.

Such a device XFPx comprises the following elements or modules:
- an optical connector OC1 able to connect an optical fiber OF1 in a removable manner;
- an optical connector OC2 able to connect an optical fiber OF2 in a removable manner; the connectors OC1 and OC2 are for example of LC type, thereby making it possible for the optical fibers OF1 and OF2 to be connected and disconnected easily and independently;
- a wavelength insertion-extraction module ADM able to insert a wavelength $\lambda_{Tx}$ into a bidirectional optical signal carried by the optical fiber OF1, able to extract a wavelength $\lambda_{Rx}$ of the bidirectional optical signal carried by the optical fiber OF1, and able to allow the other wavelengths of the bidirectional optical signal carried by the optical fiber OF1 to pass through the optical fiber OF1 to an optical fiber OF2, and vice versa; such a module ADM is also known by the term "add-drop multiplexer";
- a module WLS for selecting the wavelength to be inserted $\lambda_{Tx}$ and the wavelength to be extracted $\lambda_{Rx}$, able to receive information $\{\lambda_{Tx}, \lambda_{Rx}\}$ relating to these wavelengths and to transmit corresponding instructions to the module ADM; the selection module WLS can be included in the module ADM;
- a bidirectional optical multiplexing-demultiplexing module BMDM able to multiplex the wavelength $\lambda_{Tx}$ and to demultiplex the wavelength $\lambda_{Rx}$ in the/of the signal passing through the module ADM;
- a conversion module TE2O able to convert a downgoing electrical signal transporting data Tx into an optical signal of downgoing wavelength $\lambda_{Tx}$;
- a conversion module RO2E able to convert an upgoing wavelength $\lambda_{Rx}$ into an upgoing electrical signal transporting data Rx;
- an electrical connector EC1 able to connect electrically and in a removable manner to an OLT port able to emit a downgoing electrical signal transporting data Tx, the connector EC1 being connected to the module TE2O;
- an electrical connector EC2 able to connect electrically and in a removable manner to an OLT port able to receive an upgoing electrical signal transporting data Rx, the connector EC2 being connected to the module RO2E; the electrical connectors EC1 and EC2 are for example combined into a single connector of the same type as the electrical connector of a module SFP+ or XFP, thereby making it possible to embed the entire device in a single optical module SFP+ or XFP, with a single electrical connector on the front face and two optical connectors, for example of LC type, on the front face.

Figure 4:
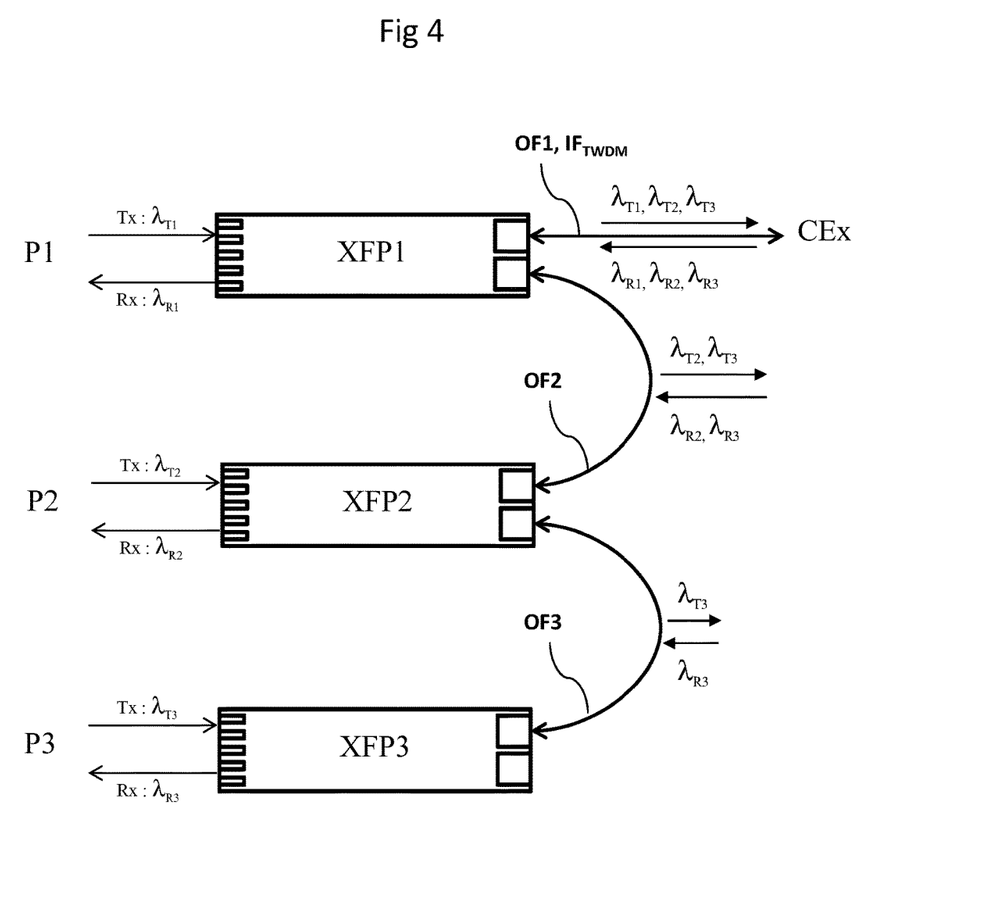
FIG. 4 presents an exemplary implementation of a cascade of optoelectronic emitter-receiver devices according to a particular embodiment of the invention.

FIG. 4 presents an exemplary implementation of a cascade of optoelectronic emitter-receiver devices according to a particular embodiment of the invention.

In this cascade, only the device XFP1 is connected to the CEx box by an interface $IF_{TWDM}$ and the optical fiber OF1. The bidirectional optical signal carried by the optical fiber OF1 comprises 3 downgoing wavelengths: $\lambda_{T1}, \lambda_{T2}, \lambda_{T3}$, and 3 upgoing wavelengths: $\lambda R_1, \lambda_{R2}, \lambda_{R3}$.

The device XFP1 receives an electrical signal "Tx:$\lambda_{T1}$" from the port P1 of the TWDM OLT, which it converts into an optical signal of wavelength $\lambda_{T1}$ which it inserts into the bidirectional optical signal carried by the optical fiber OF1.

The device XFP1 extracts a signal of wavelength $\lambda_{R1}$ from the bidirectional optical signal carried by the optical fiber OF1 and converts it into an electrical signal "Rx:$\lambda_{R1}$" which it emits to the port P1 of the TWDM OLT.

A bidirectional optical signal identical to that carried by the optical fiber OF1, but devoid of the wavelengths $\lambda_{T1}$ and $\lambda_{R1}$, passes through the device XFP1 and is carried by the optical fiber OF2.

The bidirectional optical signal carried by the optical fiber OF2 therefore comprises 2 downgoing wavelengths: $\lambda_{T2}$, $\lambda_{T3}$, and 2 upgoing wavelengths: $\lambda_{R2}$, $\lambda_{R3}$.

The device XFP2 receives an electrical signal "Tx:$\lambda_{T2}$" from the port P2 of the TWDM OLT, which it converts into an optical signal of wavelength $\lambda_{T2}$ which it inserts into the bidirectional optical signal carried by the optical fiber OF2.

The device XFP2 extracts a signal of wavelength $\lambda_{R2}$ from the bidirectional optical signal carried by the optical fiber OF2 and converts it into an electrical signal "Rx:$\lambda_{R2}$" which it emits toward the port P2 of the TWDM OLT.

A bidirectional optical signal identical to that carried by the optical fiber OF2, but devoid of the wavelengths $\lambda_{T2}$ and $\lambda_{R2}$, passes through the device XFP2 and is carried by the optical fiber OF3.

The bidirectional optical signal carried by the optical fiber OF3 therefore comprises 1 downgoing wavelength: $\lambda_{T3}$, and 1 upgoing wavelength: $\lambda_{R3}$.

The device XFP3 receives an electrical signal "Tx:$\lambda_{T3}$" from the port P3 of the TWDM OLT, which it converts into an optical signal of wavelength $\lambda_{T3}$ which it inserts into the bidirectional optical signal carried by the optical fiber OF3.

The device XFP3 extracts a signal of wavelength $\lambda_{R3}$ from the bidirectional optical signal carried by the optical fiber OF3 and converts it into an electrical signal "Rx:$\lambda_{R3}$" which it emits toward the port P3 of the TWDM OLT.

Figure 5:
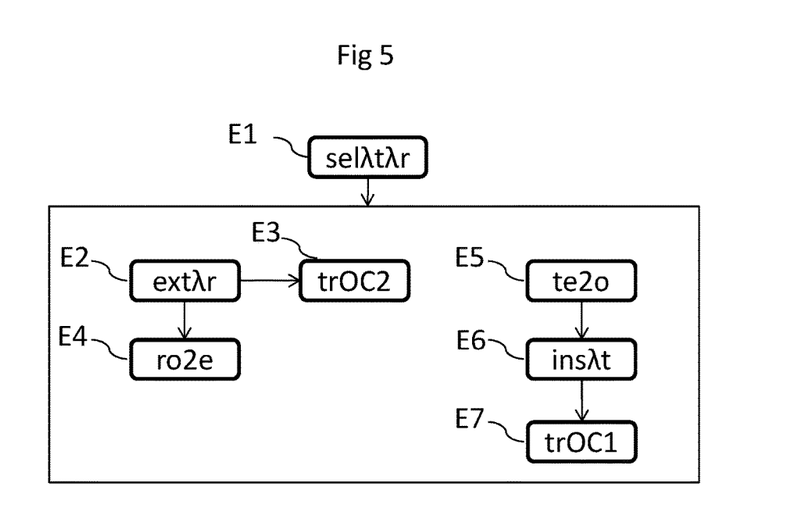
FIG. 5 presents the method for receiving an optical signal implementing the receiver device according to a particular embodiment of the invention.

FIG. 5 presents the method for receiving an optical signal implementing the receiver device according to a particular embodiment of the invention.

During a step E1, the wavelengths $\lambda_{Tx}$ and $\lambda_{Rx}$ are selected. They are specific to the OLT equipped with the device implementing the method, and correspond respectively to the downgoing and upgoing direction of the transmission of the data in the mixed optical distribution infrastructure. For convenience they are called downgoing and upgoing wavelength respectively, During a step E2, the upgoing wavelength $\lambda_{Rx}$ is extracted from a first optical signal received on a first optical connector.

During a step E3, the first optical signal is transmuted to a second optical connector, without the upgoing wavelength $\lambda_{Rx}$.

During a step E4, that may be simultaneous with step E6, the upgoing wavelength $\lambda_{Rx}$ is converted into an upgoing electrical signal transporting data Rx.

During a step E5, a so-called downgoing electrical signal, transporting data Tx intended to be transmitted in the downgoing direction of transmission, is converted into a downgoing wavelength $\lambda_{Tx}$.

During a step E6, the downgoing wavelength $\lambda_{Tx}$ is inserted into a second optical signal received on the second optical connector.

During a step E7, the second optical signal is transmitted to the first optical connector, with the downgoing wavelength $\lambda_{Tx}$.

The string of steps E2, E3 and E4 can be simultaneous with the string of steps E5, E6, E7.

An optical fiber connected to the first connector is indeed bidirectional, since it transports both the downgoing wavelength $\lambda_{Tx}$ transmitted during step E6, and the upgoing wavelength $\lambda_{Rx}$ received during step E2.

Likewise, as is apparent for the devices XFP1 and XFP2 of FIG. 4, when the optical fiber connected to the second connector is connected by its other end to the first connector of another device, this optical fiber is also bidirectional.

The exemplary embodiments of the invention which have just been presented are merely a few of the conceivable embodiments. They show that the invention makes it possible to simplify an optical distribution infrastructure mixing TDM and WDM or TWDM, by equipping each WDM or TWDM OLT port with a plug-in and removable optoelectronic emitter-receiver device having the particular feature of inserting and tapping off the upgoing and downgoing wavelengths associated with the port, and then by cascading the devices with one another. Thus, the optical signal carried by the optical fiber connected to the first of the cascade covers the whole WDM or TWDM wavelength spectrum, and this optical fiber can be connected directly to the mixed optical distribution infrastructure, without the intermediary of a wavelength multiplexer-demultiplexer as in the prior art.

The invention claimed is:

1. A system for connecting a plurality of ports (P1, P2, P3) of optical-line terminals to an optical distribution network, the optical-line-terminal ports being connected to an optoelectronic emitter-receiver device comprising a first optical connector (OC1) able to be connected to a first bidirectional optical fiber (OF1), and a second optical connector (OC2) able to be connected to a second bidirectional optical fiber (OF2), the device furthermore comprising:
   an insertion-extraction module (ADM) able to:
      extract a wavelength ($\lambda_{Rx}$) in a plurality of wavelengths making up a first optical signal received by the first optical connector (OC1) and transmit the first optical signal without the extracted wavelength to the second optical connector (OC2);
      insert a wavelength ($\lambda_{Tx}$) into a second optical signal received by the second optical connector (OC2) and transmit the second optical signal with the inserted wavelength to the first optical connector (OC1);
   an electrical-optical conversion module (EC1) able to provide the insertion-extraction module with the wavelength ($\lambda_{Tx}$) inserted into the second optical signal on the basis of an incoming electrical signal (Data Tx); and
   an optical-electrical conversion module (EC2) able to convert the wavelength ($\lambda_{Rx}$) extracted from the first optical signal by the insertion-extraction module into an outgoing electrical signal (Data Rx);
the devices (XFP1, XFP2, XFP3) of the plurality being connected together while forming a cascade, the second optical connector (OC2) of a device of the cascade being linked by optical fiber to the first optical connector (OC1) of a following device in the cascade, the first optical connector of the first device (XFP1) of the cascade being linked to the optical distribution network by an optical fiber.

2. The system for connecting a plurality of ports of optical-line terminals to an optical distribution network as claimed in claim 1, where the emitter-receiver device furthermore comprises a selection module for selecting the wavelengths to be inserted and extracted, configured to instruct the insertion-extraction module regarding the wavelength to be extracted from the first optical signal and the wavelength to be inserted into the second optical signal.

3. The system for connecting a plurality of ports of optical-line terminals to an optical distribution network as claimed in claim 2, where the emitter-receiver device furthermore comprises an electrical socket able to transmit the incoming and outgoing electrical signals, said socket being able to connect in a removable manner to an optical-line terminal port.

4. The system for connecting a plurality of ports of optical-line terminals to an optical distribution network as claimed in claim 2, where the optical connectors are able to connect in a removable manner to the bidirectional optical fibers.

5. The system for connecting a plurality of ports of optical-line terminals to an optical distribution network as claimed in claim 3, where the electrical socket is furthermore able to transmit to the selection module an electrical signal comprising information relating to the wavelengths to be inserted and extracted.

6. The system for connecting a plurality of ports of optical-line terminals to an optical distribution network as claimed in claim 5, where the optical connectors are able to connect in a removable manner to the bidirectional optical fibers.

7. The system for connecting a plurality of ports of optical-line terminals to an optical distribution network as claimed in claim 3, where an electrical signal comprising information relating to the wavelengths to be inserted and extracted is transmitted to the selection module by an electrical socket distinct from the electrical socket able to transmit the incoming and outgoing electrical signals.

8. The system for connecting a plurality of ports of optical-line terminals to an optical distribution network as claimed in claim 7, where the optical connectors are able to connect in a removable manner to the bidirectional optical fibers.

9. The system for connecting a plurality of ports of optical-line terminals to an optical distribution network as claimed in claim 3, where the optical connectors are able to connect in a removable manner to the bidirectional optical fibers.

10. The system for connecting a plurality of ports of optical-line terminals to an optical distribution network as claimed in claim 1, where the emitter-receiver device furthermore comprises an electrical socket able to transmit the incoming and outgoing electrical signals, said socket being able to connect in a removable manner to an optical-line terminal port.

11. The system for connecting a plurality of ports of optical-line terminals to an optical distribution network as claimed in claim 10, where the electrical socket is furthermore able to transmit to the selection module an electrical signal comprising information relating to the wavelengths to be inserted and extracted.

12. The system for connecting a plurality of ports of optical-line terminals to an optical distribution network as claimed in claim 11, where the optical connectors are able to connect in a removable manner to the bidirectional optical fibers.

13. The system for connecting a plurality of ports of optical-line terminals to an optical distribution network as claimed in claim 10, where an electrical signal comprising information relating to the wavelengths to be inserted and extracted is transmitted to the selection module by an electrical socket distinct from the electrical socket able to transmit the incoming and outgoing electrical signals.

14. The system for connecting a plurality of ports of optical-line terminals to an optical distribution network as claimed in claim 13, where the optical connectors are able to connect in a removable manner to the bidirectional optical fibers.

15. The system for connecting a plurality of ports of optical-line terminals to an optical distribution network as claimed in claim 10, where the optical connectors are able to connect in a removable manner to the bidirectional optical fibers.

16. The system for connecting a plurality of ports of optical-line terminals to an optical distribution network as claimed in claim 1, where the optical connectors are able to connect in a removable manner to the bidirectional optical fibers.

17. A method of optoelectronic emission-reception between a first optical connector (OC1) able to be connected to a first bidirectional optical fiber (OF1), and a second optical connector (OC2) able to be connected to a second bidirectional optical fiber (OF2), the method comprising the following steps implemented by one of a plurality of optoelectronic emitter-receiver devices connected to one of a plurality of optical-line-terminal ports:

extraction (E2) of a wavelength ($\lambda_{Rx}$) in a plurality of wavelengths making up a first optical signal received by the first optical connector (OC1);

transmission (E3) of the first optical signal without the extracted wavelength to the second optical connector (OC2);

insertion (E6) of a wavelength ($\lambda_{Tx}$) into a second optical signal received by the second optical connector (OC2);

transmission (E7) of the second optical signal with the inserted wavelength to the first optical connector (OC1);

obtaining (E5) of the wavelength ($\lambda_{Tx}$) inserted into the second optical signal by conversion of an incoming electrical signal (Data Tx);

conversion (E4) of the wavelength ($\lambda_{Rx}$) extracted from the first optical signal into an outgoing electrical signal (Data Rx), the devices of the plurality being connected together while forming a cascade, the second optical connector of a device of the cascade being linked by optical fiber to the first optical connector of a following device in the cascade, the first optical connector of the first device of the cascade being linked to an optical distribution network by an optical fiber.

* * * * *

UNITED STATES PATENT AND TRADEMARK OFFICE
CERTIFICATE OF CORRECTION

PATENT NO. : 10,070,209 B2
APPLICATION NO. : 15/518154
DATED : September 4, 2018
INVENTOR(S) : Philippe Chanclou Page 1 of 1

It is certified that error appears in the above-identified patent and that said Letters Patent is hereby corrected as shown below:

In the Specification

At Column 6, Line 59, replace "$\lambda R_1$" with -- $\lambda_{R1}$ --.

At Column 7, Line 44, replace "transmuted" with -- transmitted --.

Signed and Sealed this
Twelfth Day of November, 2019

Andrei Iancu
*Director of the United States Patent and Trademark Office*